United States Patent
Suresh et al.

(10) Patent No.: US 9,946,823 B2
(45) Date of Patent: Apr. 17, 2018

(54) DYNAMIC CONTROL OF DESIGN CLOCK GENERATION IN EMULATION

(71) Applicant: Mentor Graphics Corporation, Wilsonville, OR (US)

(72) Inventors: Krishnamurthy Suresh, Noida (IN); Satish Kumar Agarwal, Noida (IN); Amit Jain, New Delhi (IN); Sanjay Gupta, Noida (IN)

(73) Assignee: Mentor Graphics Corporation, Wilsonville, OR (US)

(*) Notice: Subject to any disclaimer, the term of this patent is extended or adjusted under 35 U.S.C. 154(b) by 741 days.

(21) Appl. No.: 14/041,211

(22) Filed: Sep. 30, 2013

(65) Prior Publication Data
US 2015/0046144 A1 Feb. 12, 2015

(30) Foreign Application Priority Data
Aug. 12, 2013 (IN) .......................... 3578/CHE/2013

(51) Int. Cl.
*G06F 9/455* (2006.01)
*G06F 17/50* (2006.01)

(52) U.S. Cl.
CPC ...... *G06F 17/5031* (2013.01); *G06F 17/5027* (2013.01); *G06F 2217/62* (2013.01); *G06F 2217/84* (2013.01)

(58) Field of Classification Search
CPC ............. G06F 17/5027; G06F 17/5031; G06F 2217/62; G06F 2217/84
See application file for complete search history.

(56) References Cited

U.S. PATENT DOCUMENTS

| | | | | |
|---|---|---|---|---|
| 5,910,930 A * | 6/1999 | Dieffenderfer | ........ | G06F 1/3203 368/156 |
| 6,040,725 A * | 3/2000 | Lee | .......................... | G06F 1/025 327/115 |
| 6,223,142 B1 * | 4/2001 | Bargh | .................. | G06F 17/5022 703/13 |
| 6,266,779 B1 * | 7/2001 | Kurd | ......................... | G06F 1/06 713/400 |
| 6,785,873 B1 * | 8/2004 | Tseng | .................. | G06F 17/5022 716/102 |
| 7,562,325 B1 * | 7/2009 | Arbel | ..................... | G06F 17/505 716/125 |

(Continued)

OTHER PUBLICATIONS

Luca Benini et al., "Logic synthesis for low power," 2002, in "Logic Synthesis and Verification," edited by S. Hassoun et al., Springer, pp. 197-223.*

(Continued)

*Primary Examiner* — Kamini S Shah
*Assistant Examiner* — Russ Guill
(74) *Attorney, Agent, or Firm* — Banner & Witcoff, Ltd.

(57) ABSTRACT

Aspects of the invention relate to techniques for dynamic control of design clock generation in emulation. A circuit design for verification is analyzed to determine one or more clock-enabling functions for a specific clock signal. Logic for generating a clock status signal based on the one or more clock-enabling signals is then determined. The clock status signal is employed to control clock generation in an emulation system for emulating the circuit design.

20 Claims, 8 Drawing Sheets

Flow chart
100

(56) References Cited

U.S. PATENT DOCUMENTS

| | | | | |
|---|---|---|---|---|
| 7,913,103 B2* | 3/2011 | Gold | ................ | G06F 1/06 327/175 |
| 8,219,946 B1* | 7/2012 | Manovit | ............... | G06F 17/505 716/104 |
| 8,468,373 B2* | 6/2013 | Machnicki | ............ | G06F 1/3203 713/300 |
| 9,395,784 B2* | 7/2016 | Sodhi | ........................ | G06F 1/26 |
| 2004/0153977 A1* | 8/2004 | Wilcox | ............... | G06F 17/5045 716/103 |
| 2004/0153981 A1* | 8/2004 | Wilcox | ............... | G06F 17/5045 716/103 |
| 2004/0230923 A1* | 11/2004 | Wilcox | ................. | G06F 17/505 716/103 |
| 2005/0131670 A1* | 6/2005 | Wang | ................. | G06F 17/5027 703/23 |
| 2007/0265823 A1* | 11/2007 | Cha | .................... | G06F 17/5027 703/24 |
| 2008/0195367 A1* | 8/2008 | Higuchi | .............. | G06F 17/5031 703/16 |
| 2008/0312900 A1* | 12/2008 | Akiba | ..................... | G06F 9/455 703/23 |

OTHER PUBLICATIONS

Ranan Fraer et al., "A new paradigm for synthesis and propagation of clock gating conditions," 2008, DAC 2008, pp. 658-663.*
Ray Turner, "Learn how processor-based emulation works," 2005, EE Times India, downloaded from: http://m.eetasia.com/ARTICLES/2005NOV/B/2005NOV01_PL_EDA_TA.pdf?SOURCES=DOWNLOAD , six pages.*

* cited by examiner

Flow chart
100

With Clock alignment optimization without dynamic unused clock edge optimization

FIG. 8B

FIG. 8C With Clock alignment optimization along with dynamic unused clock

DYNAMIC CONTROL OF DESIGN CLOCK GENERATION IN EMULATION

RELATED APPLICATIONS

This application claims priority to an India patent application, entitled "Dynamic Control Of Design Clock Generation In Emulation," filed on Aug. 12, 2013 and accorded Application Number 3578/CHE/2013, which application is incorporated entirely herein by reference.

FIELD OF THE INVENTION

The present invention relates to the field of circuit design verification technology. Various implementations of the invention may be particularly useful for controlling design clock generation in emulation dynamically.

BACKGROUND OF THE INVENTION

Modern integrated circuit designs have become extremely complex. As a result, various techniques have been developed to verify that circuit designs will operate as desired before they are implemented in an expensive manufacturing process. For example, logic simulation is a tool used for verifying the logical correctness of a hardware design. Designing hardware today involves writing a program in the hardware description language. A simulation may be performed by running that program. If the program (or model) runs correctly, then one can be reasonably assured that the logic of the design is correct at least for the cases tested in the simulation.

Software-based simulation, however, may be too slow for large complex designs such as SoC (System on Chip) designs. Although design reuse, intellectual property, and high-performance tools all can help to shorten SoC design time, they do not diminish the system verification bottleneck, which consumes 60-70% of the design cycle. Hardware emulation provides an effective way to increase verification productivity, speed up time-to-market, and deliver greater confidence in final products. In hardware emulation, a portion of a circuit design or the entire circuit design is emulated with an emulation circuit or "emulator."

Two categories of emulators have been developed. The first category is programmable logic or FPGA (field programmable gate array)-based. In an FPGA-based architecture, each chip has a network of prewired blocks of look-up tables and coupled flip-flops. A look-up table can be programmed to be a Boolean function, and each of the look-up tables can be programmed to connect or bypass the associated flip-flop(s). Look-up tables with connected flip-flops act as finite-state machines, while look-up tables with bypassed flip-flops operate as combinational logic. The look-up tables can be programmed to mimic any combinational logic of a predetermined number of inputs and outputs. To emulate a circuit design, the circuit design is first compiled and mapped to an array of interconnected FPGA chips. The compiler usually needs to partition the circuit design into pieces (sub-circuits) such that each fits into an FPGA chip. The sub-circuits are then synthesized into the look-up tables (that is, generating the contents in the look-up tables such that the look-up tables together produce the function of the sub-circuits). Subsequently, place and route is performed on the FPGA chips in a way that preserves the connectivity in the original circuit design. The programmable logic chips employed by an emulator may be commercial FPGA chips or custom-designed emulation chips containing programmable logic blocks.

The second category of emulators is processor-based: an array of Boolean processors able to share data with one another is employed to map a circuit design, and Boolean operations are scheduled and performed accordingly. Similar to the FPGA-based, the circuit design needs to be partitioned into sub-circuits first so that the code for each sub-circuit fits the instruction memory of a processor. Whether FPGA-based or processor-based, an emulator performs circuit verification in parallel since the entire circuit design executes simultaneously as it will in a real device. By contrast, a simulator performs circuit verification by executing the hardware description code serially. The different styles of execution can lead to orders of magnitude differences in execution time.

While executing like a real device, an emulator's running speed is much lower, usually no more than a few mega-hertz. Clock generation and distribution can have a significant impact on the performance of an emulator, especially considering SoC designs of today. The SoC designs of today are becoming extremely complex with an increasing number of clocks, synchronous and asynchronous. The primary drivers of the large number of asynchronous clocks are IP (intellectual property) blocks from different vendors, different bus protocols, different power modes, and increased interfaces and peripheral devices. Power consumption has also become one of the major limiting factors in current electronic system. To reduce power consumption, an SoC design typically does not keep all the clock domains active all the time. Even in an active clock domain, clock-gating may dynamically shut off the clock to portions of the clock domain that are "idle" for some cycles. It is also common practice to choose one clock amongst two or more clocks through multiplexing logic. At any given instant of time, only one of the two or more clocks is activated. The existence of inactive clocks, either by clock gating or by selection through multiplexing, allows an emulator user to control the clock generator in the emulator so that the fastest clock signals generated may be used for the fastest active clocks. While improving the emulator performance, this approach is "manual" in nature and executes through executing time-consuming software codes. It is desirable to develop a scheme for automatic control of clock generation.

BRIEF SUMMARY OF THE INVENTION

Aspects of the invention relate to techniques for dynamic control of design clock generation in emulation. A circuit design for verification is analyzed to determine one or more clock-enabling functions for a specific clock signal. A clock-enabling function determines whether a clock signal would pass through clock enabling logic. A clock-enabling signal or a combination of multiple clock-enabling signals may constitute a clock-enabling function. The analysis of the circuit design may comprise searching for clock-enabling logic such as clock-gating/clock-selecting devices along clock signal paths for the specific clock signal. Clock-gating devices may be AND gates, OR gates, other logic devices, or any combinations thereof. Clock-selecting devices may be multiplexers, other logic devices, or any combinations thereof. The clock-enabling functions may then be determined from the identified clock-gating/clock-selecting devices.

Clock status logic that generates a clock status signal based on the one or more clock-enabling functions is then determined. The determination may comprise determining a clock status function for the specific clock signal and synthesizing logic for the clock status function. The clock status function is a function that outputs a clock status signal based on the one or more clock-enabling functions.

The clock status signal is employed to control clock generation in an emulation system. The emulation system is being configured to emulate the circuit design. The emulation system usually has a clock generator for generating and distributing clock signals used in the circuit design. The output of the clock status logic may be coupled to the clock generator for optimizing clock generation. Similarly, clock status signals for other clock signals may also be coupled to the clock generator. If a particular clock signal is inactive for a period of time indicated by the corresponding clock status signal, the clock generator may automatically accelerate the generation of clock signals that are active during that period of time.

DETAILED DESCRIPTION OF THE INVENTION

Various aspects of the present invention relate to techniques for dynamic control of design clock generation in emulation. In the following description, numerous details are set forth for the purpose of explanation. However, one of ordinary skill in the art will realize that the invention may be practiced without the use of these specific details. In other instances, well-known features have not been described in details to avoid obscuring the present invention.

Some of the techniques described herein can be implemented in software instructions stored on a computer-readable medium, software instructions executed on a computer, or some combination of both. Some of the disclosed techniques, for example, can be implemented as part of an electronic design automation (EDA) tool. Such methods can be executed on a single computer or on networked computers.

The detailed description of a method or a device sometimes uses terms like "determine," "analyze" and "employ" to describe the disclosed method or the device function/structure. Such terms are high-level abstractions. The actual operations or functions/structures that correspond to these terms will vary depending on the particular implementation and are readily discernible by one of ordinary skill in the art.

Although the operations of the disclosed methods are described in a particular sequential order for convenient presentation, it should be understood that this manner of description encompasses rearrangements, unless a particular ordering is required by specific language set forth below. For example, operations described sequentially may in some cases be rearranged or performed concurrently. Moreover, for the sake of simplicity, the disclosed flow charts and block diagrams typically do not show the various ways in which particular methods can be used in conjunction with other methods.

Figure 1:
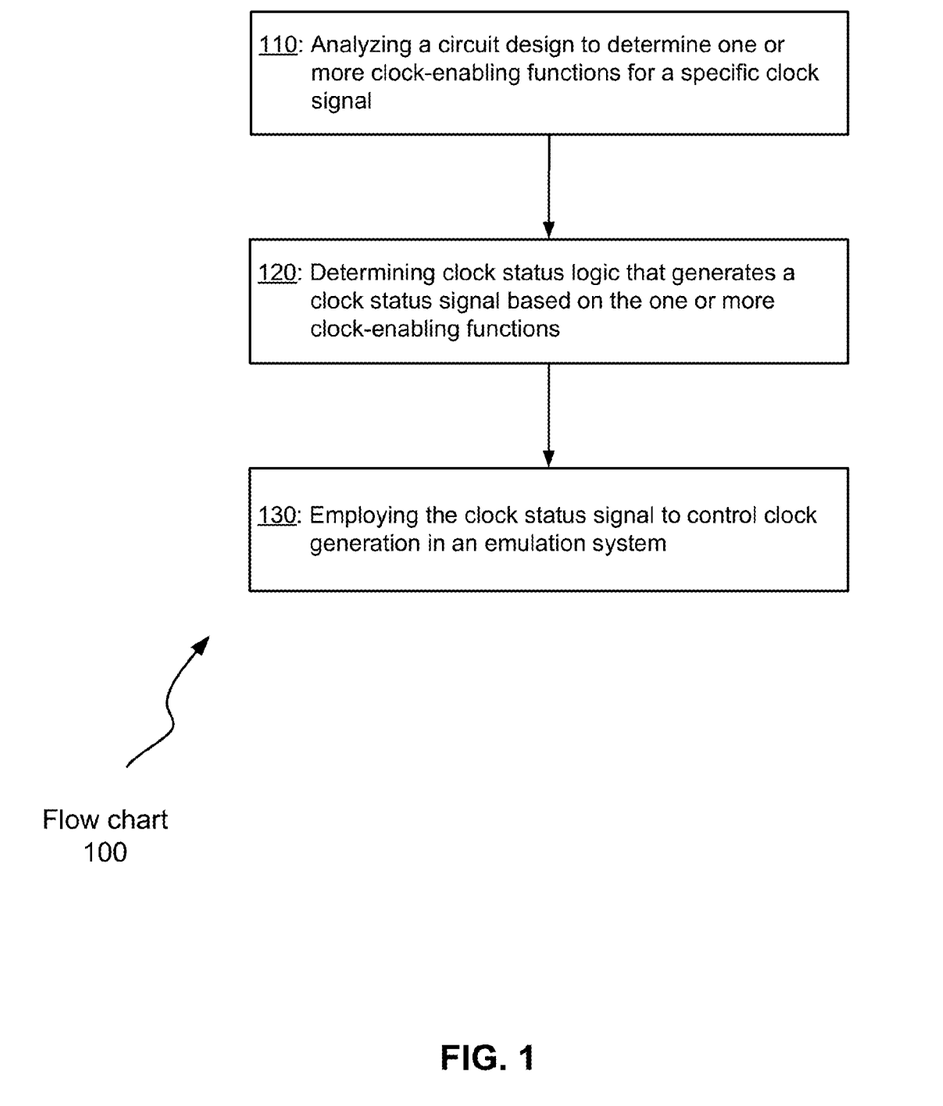
FIG. 1 illustrates a flow chart describing methods for dynamic control of design clock generation in emulation that may be employed by various embodiments of the invention.

FIG. 1 illustrates a flow chart describing methods for dynamic control of clock generation in emulation that may be employed by various embodiments of the invention.

Initially, in operation 110, a circuit design for verification is analyzed to determine one or more clock-enabling functions for a specific clock signal. A clock-enabling function determines whether a clock signal would pass clock-enabling logic. A clock-enabling signal or a combination of multiple clock-enabling signals may constitute a clock-enabling function. The clock-enabling logic may comprise clock-gating/clock-selecting devices. As noted previously, not all of the clocks may be active during a specific period of time. For example, clock gating is often used to reduce power consumption by dynamically shutting off a clock to portions of a design that are "idle" for some cycles. Other reasons may also exist for disabling some of the clocks in some parts of the circuit design or the entire design. In addition, a clock multiplexer may be used to select a clock signal from several clock signals for a portion of the design or the entire design. Once these clock-gating/clock-selecting devices are identified, clock-enabling functions can be readily determined.

Figure 2:
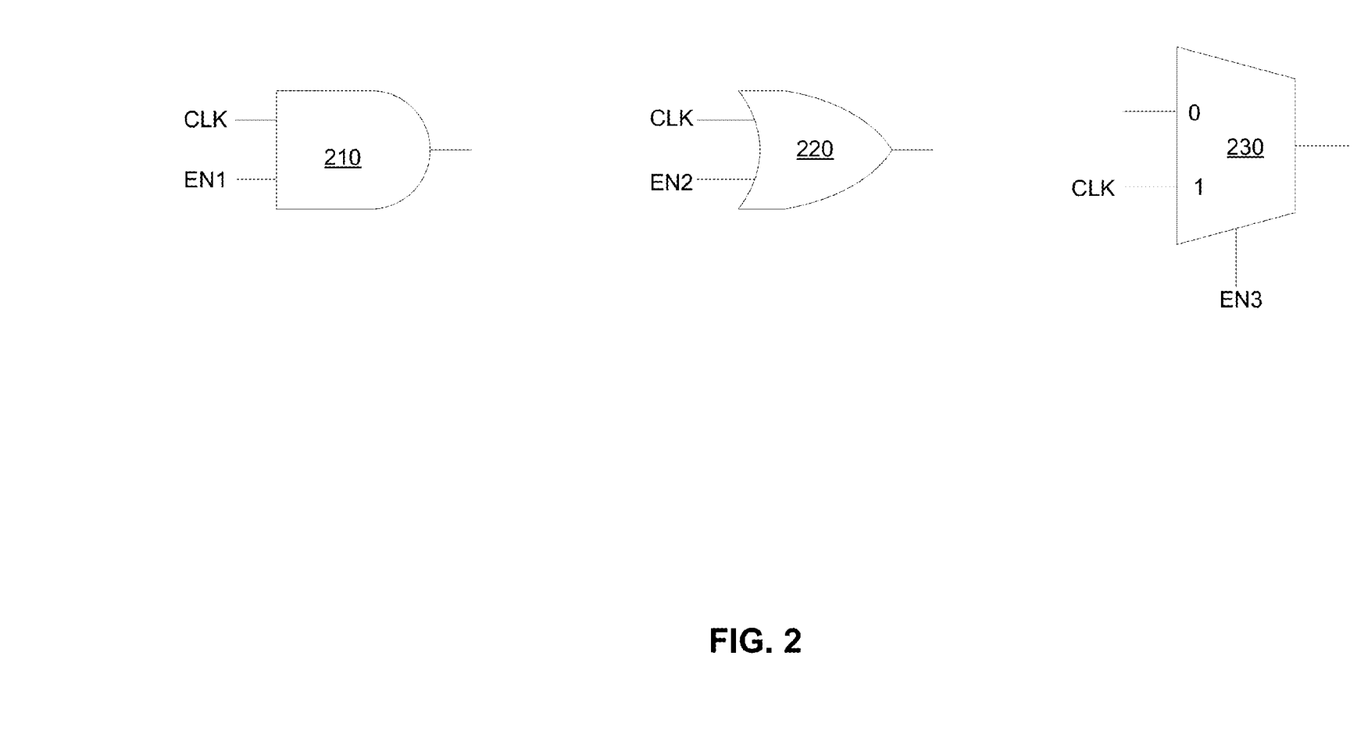
FIG. 2 illustrates three examples of clock-gating and clock-selecting devices that may be used by a circuit design to block a clock signal with a clock enabling signal.

In some embodiments of the invention, the analysis of the circuit design in operation 110 thus comprises searching for clock-enabling logic along clock signal paths for the specific clock signal. Clock-gating devices may be AND gates, OR gates, other logic devices, or any combinations thereof. Clock-selecting devices may be multiplexers, other logic devices, or any combinations thereof. FIG. 2 illustrates three devices that may be used by a circuit design to block a clock signal with a clock-enabling signal (clock-enabling function). In the figure, device 210 is an AND gate, device 220 is an OR gate and device 230 is a multiplexer. When the clock-enabling signal is a logical "0" for the devices 210 and 230 or a logical "1" for the device 220, the clock signal (denoted as "CLK" in the figure) is blocked by the three devices shown.

Figure 5A:
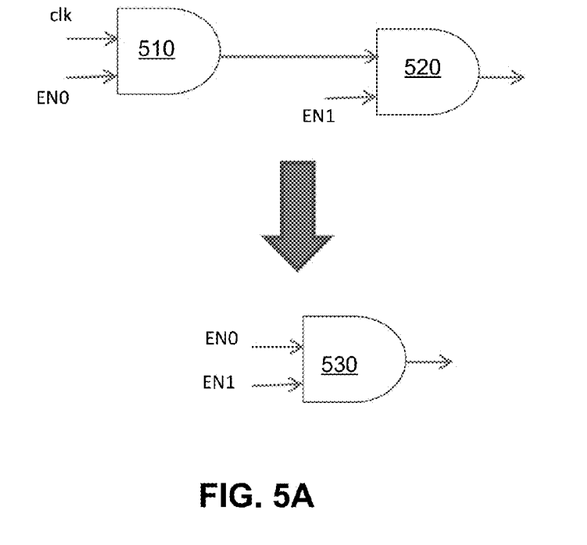
FIGS. 5A and 5B illustrate two examples of clock-enabling functions that are combinations of two clock-enabling signals.
Figure 5B:
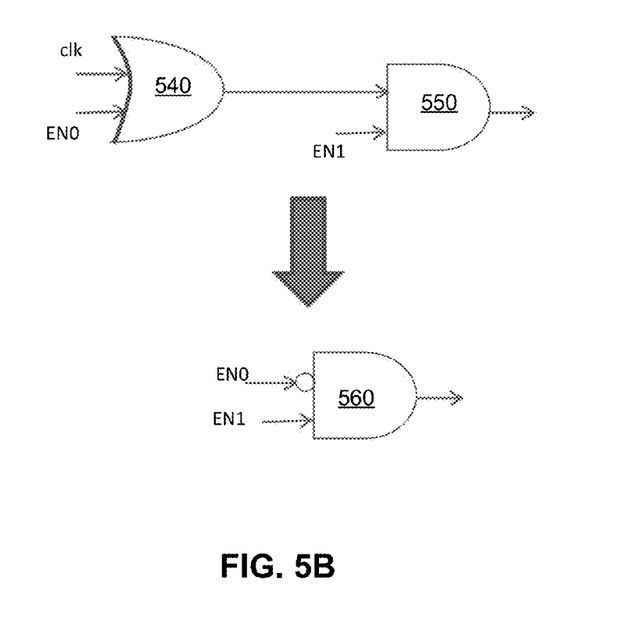

FIGS. 5A and 5B illustrate two examples of clock-enabling functions that are combinations of two clock-enabling signals. In FIG. 5A, a clock signal (clk) passes through two AND gates 510 and 520 being connected in series, each being controlled by a clock-enabling signal (EN0 or EN1). The clock-enabling function 530 ANDs the clock-enabling signals EN0 and EN1. The clock signal clk is blocked if the output of the clock-enabling function 530 is a logical "0". In FIG. 5B, a clock signal clk passes through an OR gates 540 and an AND gate 550 being connected in series, each being controlled by a clock-enabling signal (EN0 or EN1). The clock-enabling function 560 ANDs the clock signal EN1 and the inverse of the clock-enabling signal EN0. Again, the clock signal clk is blocked if the output of the clock-enabling function 560 is a logical "0".

Figure 6:
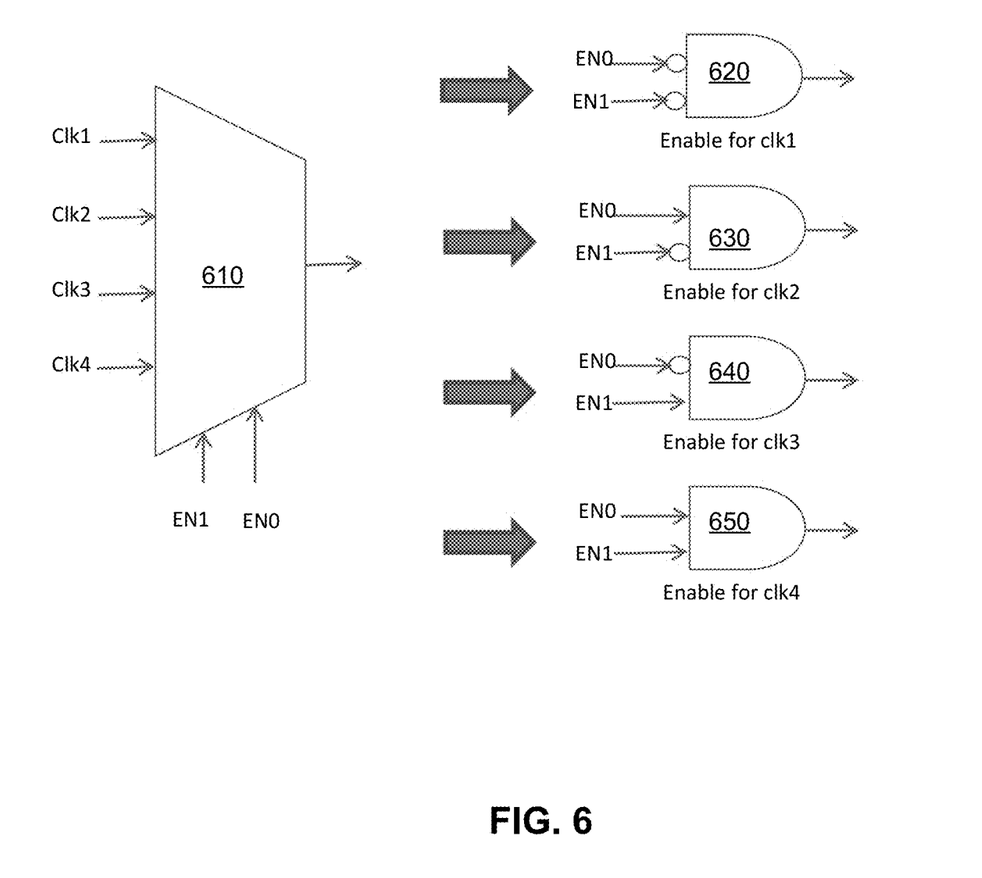
FIG. 6 illustrates another example of a clock-enabling function that is a combination of two clock-enabling signals. In the figure, a 4-to-1 multiplexer serves as the clock-enabling logic.

FIG. 6 illustrates another example of a clock-enabling function that is a combination of two clock-enabling signals. Here, a 4-to-1 multiplexer 610 selects a clock signal from four clock signals (clk1-clk4) based on clock enabling signals EN1 and EN0). The clock-enabling functions 620-650 for the four clock signals are also shown. For example, the clock-enabling function 620 for the first clock signal clk1 INVERTs the two clock-enabling signals EN1 and EN0 first and then ANDs them together. The clock signal clk1 is blocked if the output of the clock-enabling function 620 is a logical "0".

Figure 3:
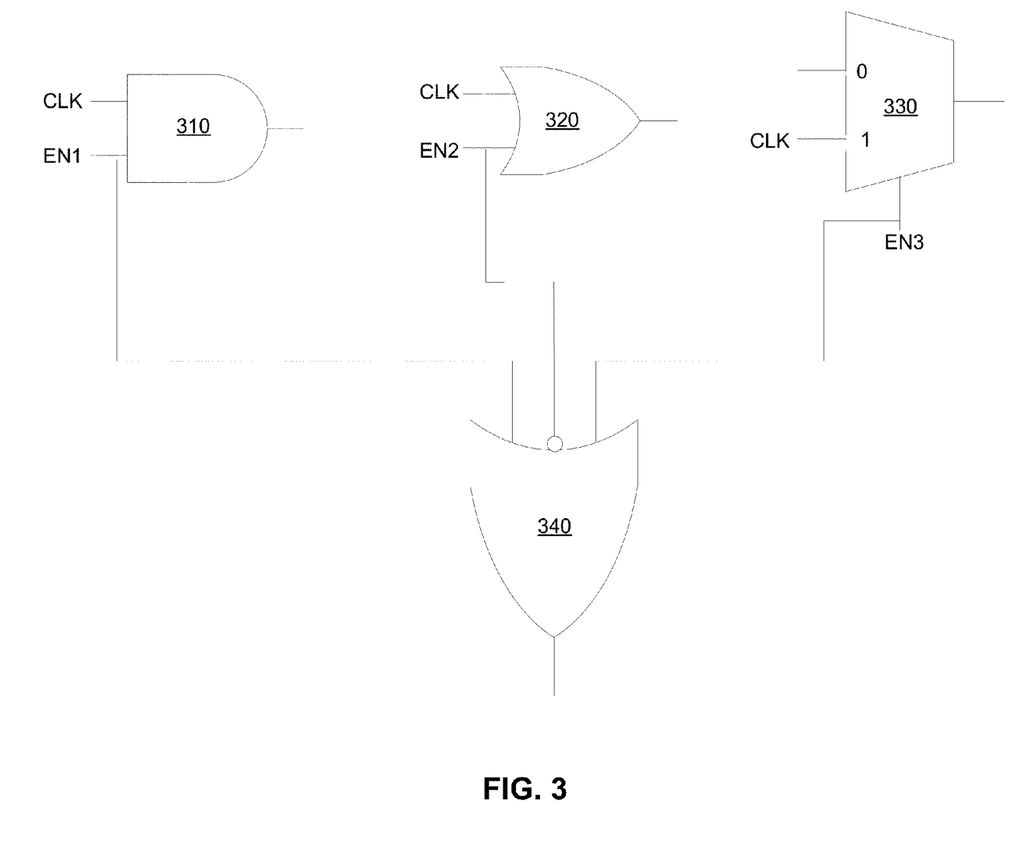
FIG. 3 illustrates an example of using an OR gate to produce the clock status signal based on clock enabling signals from three different clock signal paths.

Next, in operation 120, clock status logic that generates a clock status signal based on the one or more clock-enabling functions is determined. The determination may comprise determining a clock status function for the specific clock signal and synthesizing logic for the clock status function. The clock status function is a function that outputs a clock status signal based on the one or more clock-enabling functions. The clock status signal indicates whether the specific clock signal is in use in the circuit design or not. A simple clock status function may OR outputs of the clock-enabling functions. FIG. 3 illustrates such an example of using an OR gate to produce the clock status signal. The OR gate 340 has three inputs coupled to the three clock-enabling signals (EN1, EN2, EN3) for an AND gate 310, an OR gate 320 and a multiplexer 330, respectively. Here, each of the clock-enabling signals constitutes a clock-enabling function. The clock-enabling signal EN2 is inverted at the input side of the OR gate 340 because a logic "1" is used by the OR gate 320 to block the clock signal. If the clock status signal outputted by the OR gate 340 is a logical "0", the specific clock signal is inactive assuming the AND gate 310, the OR gate 320 and the multiplexer 330 block/enable the clock signal for different clock signal paths. In an FPGA-based emulator, this OR gate 340 may be mapped to a look-up table.

Next, in operation 130, the clock status signal is employed to control clock generation in an emulation system. The emulation system is being configured to emulate the circuit design. An emulator usually comprises a clock generator to generate and distribute clock signals used by a design. To employ the clock status signal to control clock generation, the output of the clock status logic determined in the operation 120 may be coupled to the clock generator. This may allow the clock generator to accelerate generation of clock signals that are active during inactive periods of time for the specific clock signal. Clock status signals for other clock signals used in the circuit design may also be supplied to the clock generator. As such, the clock generator can efficiently allocate its available clock resources and improve the emulation performance. This can be adopted by various types of emulators, FPGA-based or processor-based, event-based or cycle-based and by various clock generation methods.

Figure 7A:
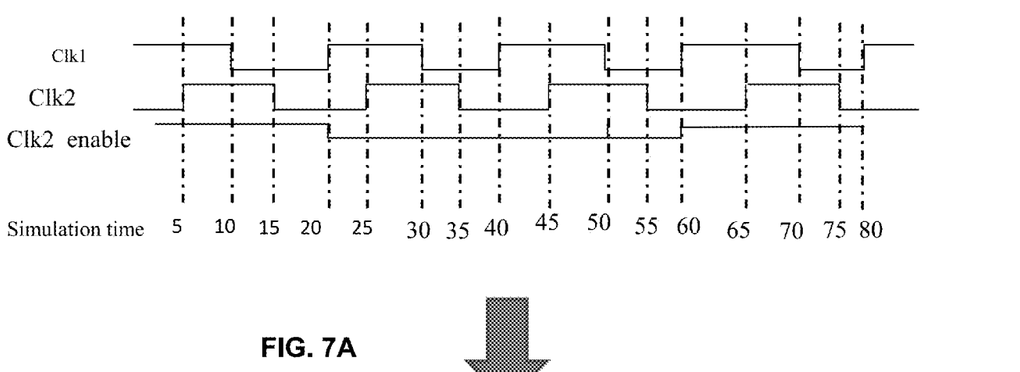
FIGS. 7A and 7B a clock system of two clock signals generated by independent edge clocking without and with dynamic control of clock generation that may be employed by various embodiments of the invention, respectively.
Figure 7B:
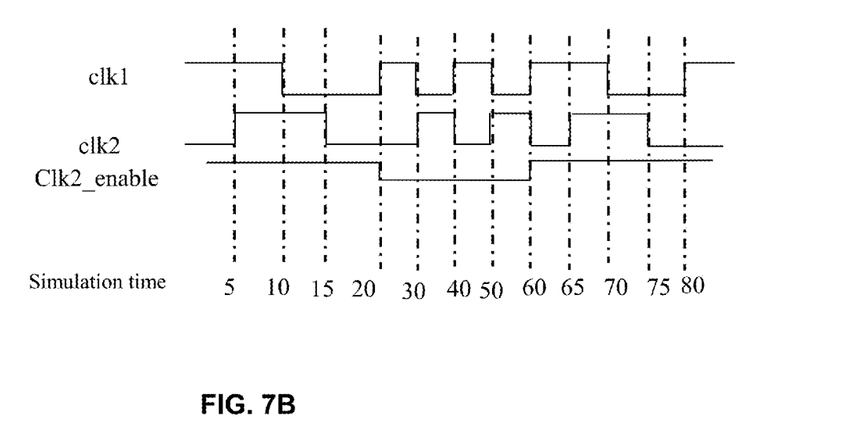

FIGS. 7A and 7B illustrates a clock system of two clock signals generated by independent edge clocking without and with dynamic control of clock generation that may be employed by various embodiments of the invention, respectively. Of the two clock signals (clk1 and clk2), the clock signal clk2 is controlled by a clock enable signal (Clk2_enable). Without the dynamic control of clock generation (FIG. 7A), emulation cycles are scheduled for nine simulation time points from 20 through 60 when the clock signal clk2 is blocked (including the transition points). With the dynamic control of clock generation (FIG. 7B), by contrast, only five emulation cycles remain when the clock-enabling signal clk2_enabling is low. In effect, the generation of the clock signal clk1 is accelerated and the emulation time is reduced.

While no emulation cycles are dedicated to its edges when the clock-enabling signal clk2_enabling is low, the clock signal clk2 may still change such that an edge in the right direction is generated for 'clk2' when the 'clk2_enable' is asserted again.

Figure 8A:
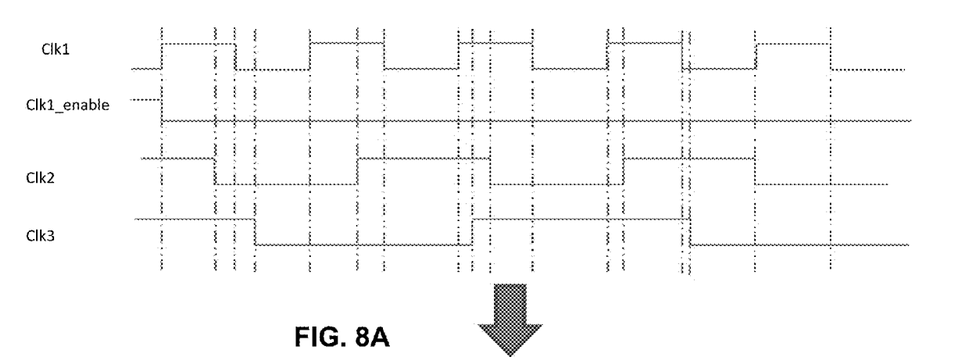
FIGS. 8A, 8B and 8C illustrate a clock system of three clock signals generated by independent edge clocking, by aligned edge clocking, and by aligned edge clocking with dynamic control of clock generation that may be employed by various embodiments of the invention, respectively.
Figure 8B:
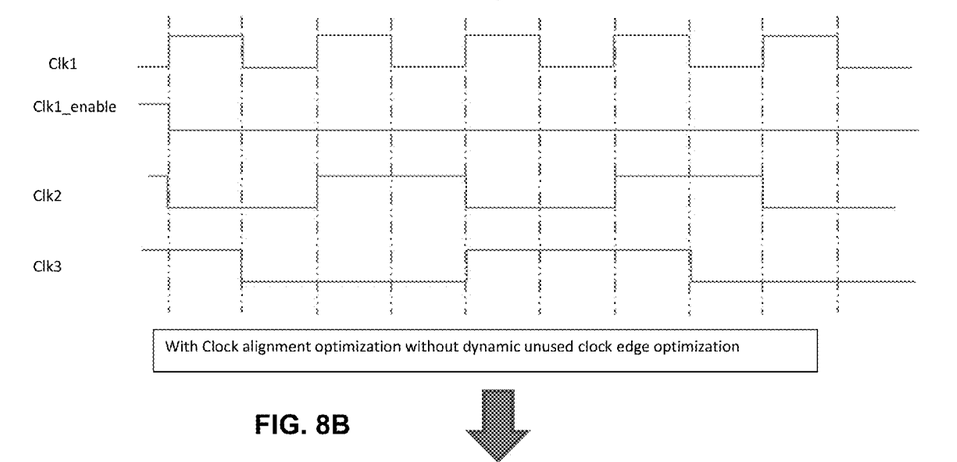
Figure 8C:
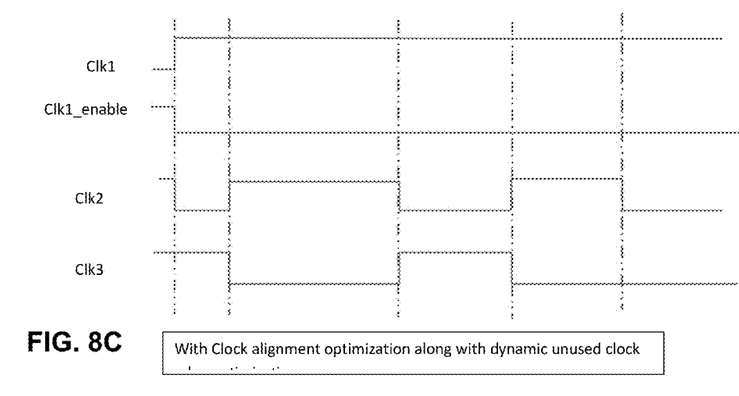

FIGS. 8A, 8B and 8C illustrate a clock system of three clock signals generated by independent edge clocking, by aligned edge clocking, and by aligned edge clocking with dynamic control of clock generation that may be employed by various embodiments of the invention, respectively. Of the three clock signals (clk1, clk2 and clk3), the clock signal clk1 is blocked by a clock enable signal (Clk1_enable). Without the dynamic control of clock generation, the independent edge clocking requires seventeen emulation cycles as showed by seventeen dotted lines (FIG. 8A). The aligned edge clocking reduces the number of emulation cycles to ten (FIG. 8B) by exploiting the fact that the circuit operation does not depend upon the clock edges for all of the three clock signals being independent. Here, edges of the clock signals clk2 and clk3 are aligned to the fastest clock signal clk1. The dynamic control of clock generation can further reduce the number of emulation cycles to five (FIG. 8C). Edges of the clock signals clk2 and clk3 are aligned.

Figure 4:
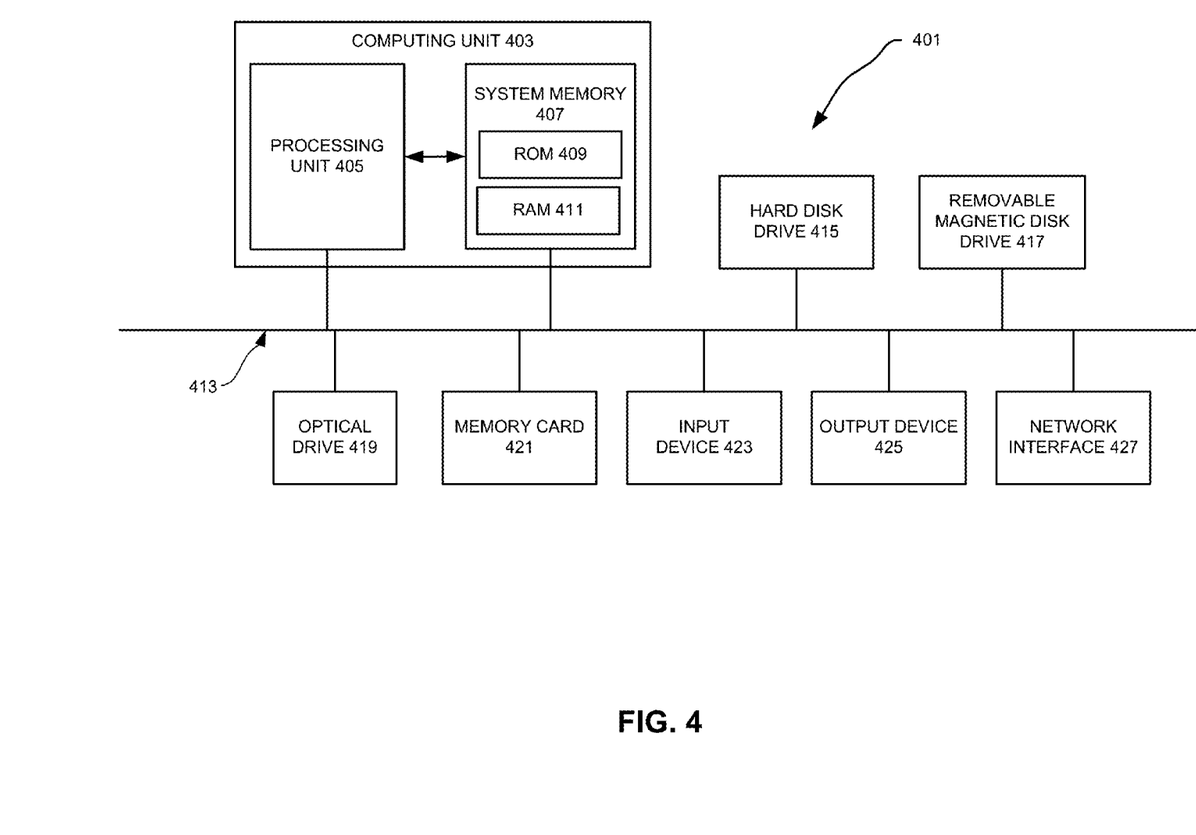
FIG. 4 illustrates a programmable computer system with which various embodiments of the invention may be employed.

Various embodiments of the invention may be implemented through the execution of software instructions by a computing device, such as a programmable computer. FIG. 4 shows an illustrative example of such a programmable computer (a computing device 401). As seen in this figure, the computing device 401 includes a computing unit 403 with a processing unit 405 and a system memory 407. The processing unit 405 may be any type of programmable electronic device for executing software instructions, but will conventionally be a microprocessor. The system memory 407 may include both a read-only memory (ROM) 409 and a random access memory (RAM) 411. As will be appreciated by those of ordinary skill in the art, both the read-only memory (ROM) 409 and the random access memory (RAM) 411 may store software instructions for execution by the processing unit 405.

The processing unit 405 and the system memory 407 are connected, either directly or indirectly, through a bus 413 or alternate communication structure, to one or more peripheral devices. For example, the processing unit 405 or the system memory 407 may be directly or indirectly connected to one or more additional memory storage devices, such as a "hard" magnetic disk drive 415, a removable magnetic disk drive 417, an optical disk drive 419, or a flash memory card 421. The processing unit 405 and the system memory 407 also may be directly or indirectly connected to one or more input devices 423 and one or more output devices 425. The input devices 423 may include, for example, a keyboard, a pointing device (such as a mouse, touchpad, stylus, trackball, or joystick), a scanner, a camera, and a microphone. The output devices 425 may include, for example, a monitor display, a printer and speakers. With various examples of the computer 401, one or more of the peripheral devices 415-425 may be internally housed with the computing unit 403. Alternately, one or more of the peripheral devices 415-425 may be external to the housing for the computing unit 403 and connected to the bus 413 through, for example, a Universal Serial Bus (USB) connection.

With some implementations, the computing unit 403 may be directly or indirectly connected to one or more network interfaces 427 for communicating with other devices making up a network. The network interface 427 translates data and control signals from the computing unit 403 into network messages according to one or more communication protocols, such as the transmission control protocol (TCP) and the Internet protocol (IP). Also, the interface 427 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computer 401 is illustrated as an example only, and it is not intended to be limiting. Various embodiments of the invention may be implemented using one or more computing devices that include the components of the computer 401 illustrated in FIG. 4, which include only a subset of the components illustrated in FIG. 4, or which include an alternate combination of components, including components that are not shown in FIG. 4. For example, various embodiments of the invention may be implemented using a multi-processor computer, a plurality of single and/or multiprocessor computers arranged into a network, or some combination of both.

Some other embodiments of the invention may be implemented by software instructions, stored on a non-transitory computer-readable medium, for instructing one or more programmable computers/computer systems to perform operations such as those shown in the flow chart 400 in FIG. 4. As used herein, the term "non-transitory computer-readable medium" refers to computer-readable medium that are capable of storing data for future retrieval, and not propagating electro-magnetic waves. The non-transitory computer-readable medium may be, for example, a magnetic storage device, an optical storage device, a "punched" surface type device, or a solid state storage device.

Conclusion

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

What is claimed is:

1. A method, executed by at least one processor of a computer emulation system, comprising:
searching for clock-enabling logic along clock signal paths of a specific clock signal in a circuit design;
identifying, based on the clock-enabling logic, one or more clock-enabling functions that determine whether the specific clock signal passes the clock-enabling logic;
determining, based on the one or more clock-enabling functions, clock status logic that generates a clock status signal indicating whether the specific clock signal is disabled for a period of time in the circuit design; and
emulating the circuit design with the computer emulation system, the emulating including accelerating, in response to the clock status signal indicating that the specific clock signal is disabled, generation of an active clock signal during the period of time.

2. The method recited in claim 1, wherein the determining of the clock status logic comprises:
determining a clock status function for the specific clock signal, the clock status function outputting the clock status signal based on the one or more clock-enabling functions; and
synthesizing logic for the clock status function.

3. The method recited in claim 1, wherein the clock-enabling logic comprises clock-gating devices.

4. The method recited in claim 1, wherein the clock-enabling logic comprises clock-selecting devices.

5. The method recited in claim 1, wherein the accelerating of the generation of the active clock signal comprises:
coupling output of the clock status logic to a clock generator in the computer emulation system.

6. The method recited in claim 1, wherein the accelerating of the generation of the active clock signal comprises:
accelerating generation of edges for the active clock signal.

7. The method recited in claim 6, wherein the accelerating of the generation of the edges for the active clock signal comprises:
aligning, during the period of time, the edges for the active clock signal to edges for a fastest active clock signal.

8. The method recited in claim 6, wherein the accelerating of the generation of the edges for the active clock signal comprises:
assigning, to the edges for the active clock signal during the period of time, emulation cycles that would be assigned to edges for the specific clock signal that are not coincident with the edges for the active clock signal if the specific clock signal was enabled.

9. The method of claim 1, further comprising:
accelerating, during the period of time, the specific clock signal in accordance with the clock status signal.

10. One or more non-transitory computer-readable media storing computer-executable instructions, that if executed, cause one or more processors to:
search for clock-enabling logic along clock signal paths of a specific clock signal in a circuit design;
identify, based on the clock-enabling logic, one or more clock-enabling functions that determine whether the specific clock signal passes the clock-enabling logic;
determine, based on the one or more clock-enabling functions, clock status logic that generates a clock status signal indicating whether the specific clock signal is disabled for a period of time in the circuit design; and
emulate the circuit design with an emulation system, wherein to emulate the circuit design, the instructions, if executed, cause the one or more processors to accelerate, in response to the clock status signal indicating that the specific clock signal is disabled, generation of an active clock signal during the period of time.

11. The one or more non-transitory computer-readable media recited in claim 10, wherein to determine the clock status logic, the instructions, if executed, cause the one or more processors to:

determine a clock status function for the specific clock signal, the clock status function outputting the clock status signal based on the one or more clock-enabling functions; and synthesize logic for the clock status function.

12. The one or more non-transitory computer-readable media recited in claim 10, wherein the clock-enabling logic comprises clock-gating devices and/or clock-selecting devices.

13. The one or more non-transitory computer-readable media recited in claim 10, wherein to accelerate the generation of the active clock signal, the instructions, if executed, cause the one or more processors to:

couple output of the clock status logic to a clock generator in the emulation system.

14. The one or more non-transitory computer-readable media recited in claim 10, wherein to accelerate the generation of the active clock signal, the instructions, if executed, cause the one or more processors to:

accelerate generation of edges for the active clock signal.

15. The one or more non-transitory computer-readable media recited in claim 14, wherein to accelerate the generation of the edges for the active clock signal, the instructions, if executed, cause the one or more processors to:

align, during the period of time, the edges for the active clock signal to edges for a fastest active clock signal.

16. The one or more non-transitory computer-readable media recited in claim 14, wherein to accelerate the generation of the edges for the active clock signal, the instructions, if executed, cause the one or more processors to:

assign, to the edges for the active clock signal during the period of time, emulation cycles that would be assigned to edges for the specific clock signal that are not coincident with edges for the active clock signal if the specific clock signal was enabled.

17. A system, comprising:

one or more processors, and one or more non-transitory computer-readable media storing computer-executable instructions, that if executed, cause the one or more processors to:

search for clock-enabling logic along clock signal paths of a specific clock signal in a circuit design;

identify, based on the clock-enabling logic, one or more clock-enabling functions that determine whether the specific clock signal passes the clock-enabling logic;

determine, based on the one or more clock-enabling functions, clock status logic that generates a clock status signal indicating whether the specific clock signal is disabled for a period of time in the circuit design; and emulate the circuit design with an emulation system, wherein to emulate the circuit design, the instructions, if executed, cause the one or more processor to accelerate, in response to the specific clock signal indicating that the clock status signal is disabled, generation of an active clock signal during the period of time.

18. The system recited in claim 17, wherein to determine the clock status logic, the instructions, if executed, cause the one or more processors to:

determine a clock status function for the specific clock signal, the clock status function outputting the clock status signal based on the one or more clock-enabling functions; and synthesize logic for the clock status function.

19. The system recited in claim 17, wherein to accelerate the generation of the active clock signal, the instructions, if executed, cause the one or more processors to:

couple output of the clock status logic to a clock generator in the emulation system.

20. The system recited in claim 17, wherein to accelerate the generation of the active clock signal, the instructions, if executed, cause the one or more processors to:

accelerate generation of edges for the active clock signal.

* * * * *